United States Patent [19]

Kielhorn

[11] 4,267,660
[45] May 19, 1981

[54] STAKE FOR ANIMAL TRAPS

[76] Inventor: Larry L. Kielhorn, Holstein, Iowa 51025

[21] Appl. No.: 6,998

[22] Filed: Jan. 29, 1979

[51] Int. Cl.³ ............................................... A01M 23/28
[52] U.S. Cl. ............................................. 43/96; 43/58
[58] Field of Search ....................................... 43/96, 58

[56] References Cited

U.S. PATENT DOCUMENTS

| 793,170 | 6/1905 | Baer .......................................... 43/96 |
| 2,720,050 | 10/1955 | Pfeiffer ..................................... 43/96 |
| 3,974,592 | 8/1976 | Staats ....................................... 43/96 |

FOREIGN PATENT DOCUMENTS

| 806887 | 2/1969 | Canada ..................................... 43/96 |
| 867032 | 3/1971 | Canada ..................................... 43/96 |

Primary Examiner—Othell M. Simpson
Assistant Examiner—J. T. Zatarga
Attorney, Agent, or Firm—Zarley, McKee, Thomte, Voorhees & Sease

[57] ABSTRACT

A stake for animal traps comprising a vertical post portion with the upper end terminating in a transverse cross bar. Each end of the cross bar is notched to receive opposed spring loaded side frames of a rotating frame animal trap wherein the stake is able to support and stabilize the animal trap.

6 Claims, 3 Drawing Figures

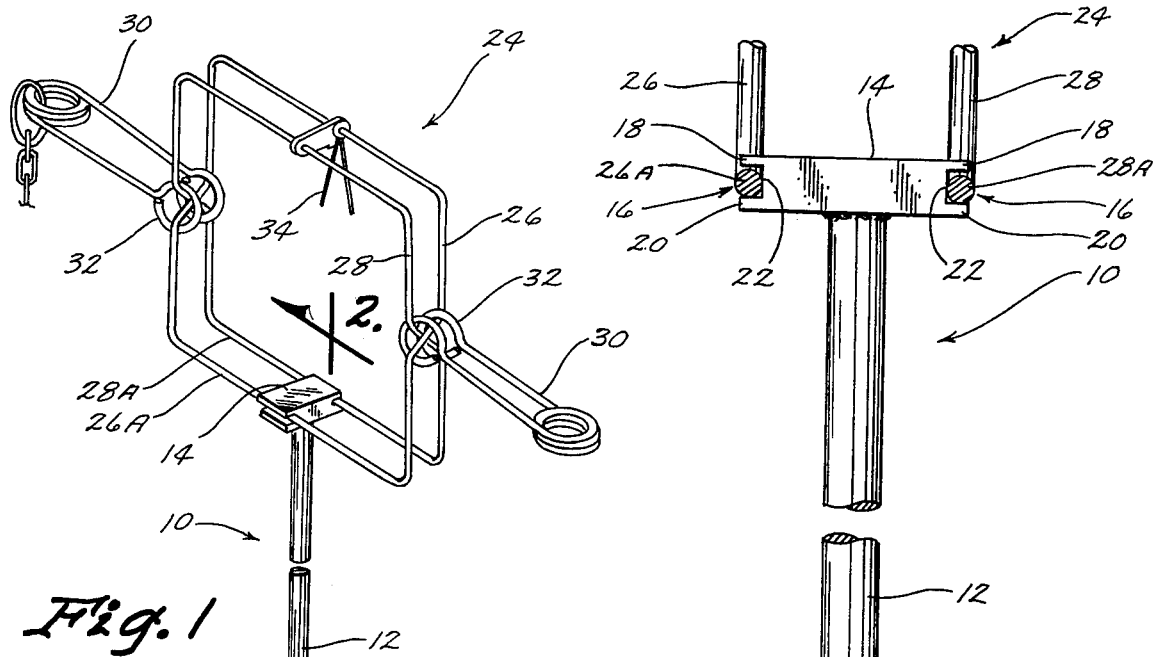
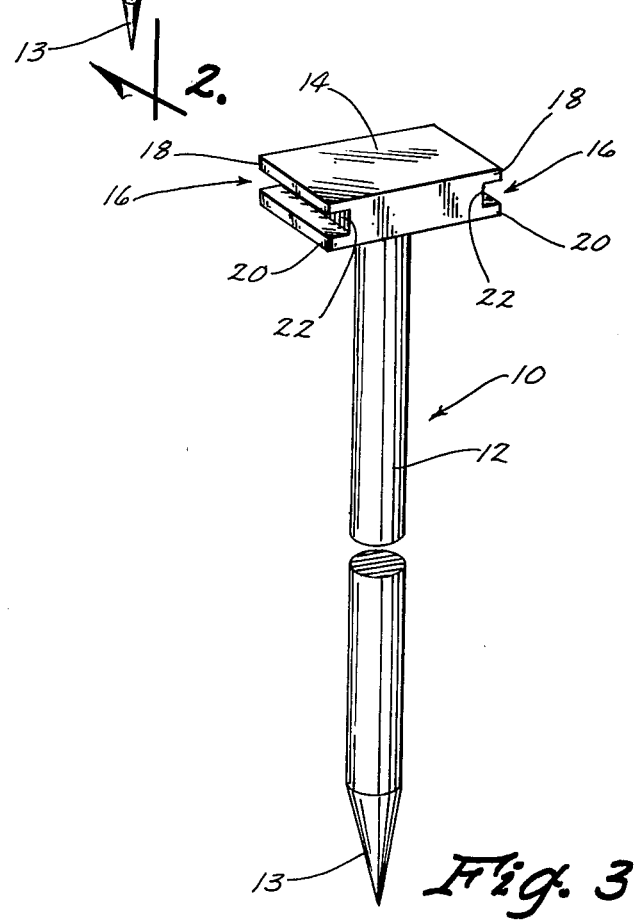

STAKE FOR ANIMAL TRAPS

BACKGROUND OF THE INVENTION

This invention relates to animal traps and particularly to stakes for supporting and stabilizing rotating frame animal traps. Such traps have long been in use and a typical trap of this design is the Conibear trap disclosed in U.S. Pat. No. 3,010,245 issued to F. E. Conibear on Nov. 28, 1961. One of the problems in using such traps is the provision of means to hold the trap in the desired position while it is in a set condition.

SUMMARY OF THE INVENTION

The trap stake of this invention is comprised of an elongated post having a transverse cross bar at its upper end. The cross bar has notches in its opposite ends to receive the lower rod portion of the opposed frames of a rotating frame animal trap. When such a trap is in its set condition, the lower rod portions of the opposite frames are in parallel spaced relation and are received in the aforesaid notches of the trap stake. When the trap is released by an animal or the like, the lower rod portions of the frames are free to rotate laterally outwardly from the notches so that the stake does not in any way interfere with the normal function of the trap.

Accordingly, the trap stake of this invention can make the rotating frame animal trap solid and stable so that the trap will not fall over. Further, the trap can be held in any position whether on a flat or inclined surface. The trapper can adjust the height of the trap to any height above water or snow to keep the trap from freezing down. In addition, the trap stake of this invention allows the trapper to adjust the trap to any height under the water or snow. The trap stake will not in any way interfere with the normal function of the trap.

BRIEF DESCRIPTION OF THE DRAWINGS

FIG. 1 is a perspective view of a conventional rotating frame animal trap mounted on the stake of this invention;

FIG. 2 is an enlarged scale sectional view taken on line 2—2 of FIG. 1; and

FIG. 3 is a perspective view of the trap stake.

DESCRIPTION OF THE PREFERRED EMBODIMENT

The trap stake 10 is comprised of an elongated post 12 with a sharpened lower end 13. A cross bar 14 is welded or otherwise secured to the upper end of post 12 and extends outwardly at right angles from the post. The cross bar 14 is preferably centered on the post 12.

Notches 16 are cut or otherwise formed in the opposite ends of the cross bar 14. The notches 16 are substantially rectangular in shape and are defined by an upper lip 18, a lower lip 20, and an inner vertical wall 22.

The trap 24 is of conventional construction and is well described in the aforesaid U.S. Pat. No. 3,010,245 and also in U.S. Pat. No. 3,974,592 issued Aug. 17, 1976. The trap 24 is comprised of rectangular frames 26 and 28 which each have lower rod portions 26A and 28A, respectively. Conventional springs have eyelets 32 which embrace the center portions of the sides of the frames 26 and 28. The trigger mechanism 34 releasably holds the frames 26 and 28 in the position shown in FIG. 1 against the action of the springs 30 which urge the frames to rotate with respect to each other when the trigger 34 is released in conventional fashion.

As shown in FIG. 2, the "set" trap of FIG. 1 causes the lower rod portions 26A and 28A to exist in closely spaced parallel relation and to dwell within the confines of the notches 16 of stake 10. The lips 18 and 20 of the notches embrace the upper and lower sides of the rod portions 26A and 28A and permit the stake to easily support the trap 24. As can be appreciated, the trap 24 can be held in the substantially vertical position of FIG. 1, or it could be placed in any other desired position depending upon the angle in which the stake 10 penetrated the supporting ground or snow.

The height of the trap can be adjusted by causing the stake 10 to penetrate the supporting surface to any desired degree. Normally, it is desired to hold the lower rod portions 26A and 28A slightly above the height of any water, ground or snow underneath the trap to prevent the trap from freezing in an inoperative position. When the trap is placed in a stream or the like, the stake 10 can be forced into the bed of the stream at any desired height to place the trap in its desired height.

When the animal causes the trigger mechanism 24 to release the frames of the trap in conventional fashion, the lower rod portions 26A and 28A can easily move laterally out of the notches 16 of the stake so that the stake will not in any way interfere with the normal operation of the trap.

Thus, from the foregoing, it is seen that this invention will achieve its stated objectives.

I claim:

1. A stake for animal traps, comprising,
   an elongated supporting post having an upper end,
   a cross bar secured at its center to the upper end of said post and extending transversely in opposite directions from said post,
   said cross bar having opposite ends, and a notch in each end adapted to receive frame members of a rotating frame animal trap; said notches being positioned and oriented in the ends of said crossbar and being defined by upper and lower lip means to permit parallel trap rod portions to be rotated into and out of said notches in directions towards and away from, respectively, the center of said crossbar.

2. The stake of claim 1 wherein said notches are rectangular in shape.

3. The stake of claim 1 wherein said post has a sharpened lower end.

4. In combination, a rotating frame animal trap and a trap stake, comprising,
   a trap comprising two frames rotatably mounted with respect to each other and each having a lower rod portion, the rod portions of each frame being substantially parallel and closely spaced when said trap is set, spring means on said trap normally urging said rod portions apart when said trap is set, and trigger means on said trap releasably holding said frames against movement when said trap is set,
   and a trap stake comprising an elongated supporting post having an upper end,
   a cross bar secured at its center to the upper end of said post and extending transversely in opposite directions from said post,
   said cross bar having opposite ends, and a notch in each end,
   the lower rod portions of said trap dwelling in said notches of said trap stake to permit said trap stake to support said trap; said notches being positioned and oriented in the ends of said crossbar and being defined by upper and lower lip means to permit said lower rod portions to be rotated into and out of said notches in directions towards and away from, respectively, the center of said crossbar.

5. The configuration of claim 4 wherein said cross bar is located between said lower rod portions to permit said lower rod portions to be moved outwardly from said notches when said trigger means is actuated to release said frames to movement.

6. The combination of claim 4 wherein said notches extend above and below said lower rod portions to hold said trap against upper or lower movement with respect to said trap stake.

* * * * *